No. 883,947.
PATENTED APR. 7, 1908.
O. M. FRALEY.
VEHICLE WHEEL.
APPLICATION FILED JULY 15, 1907.
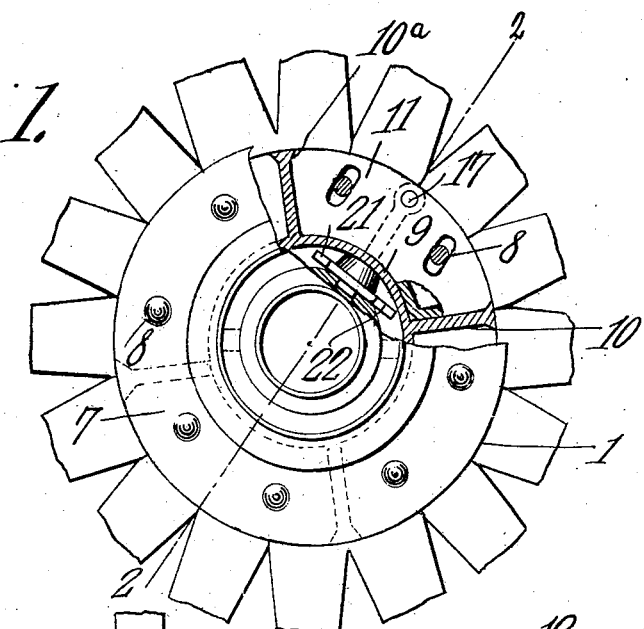
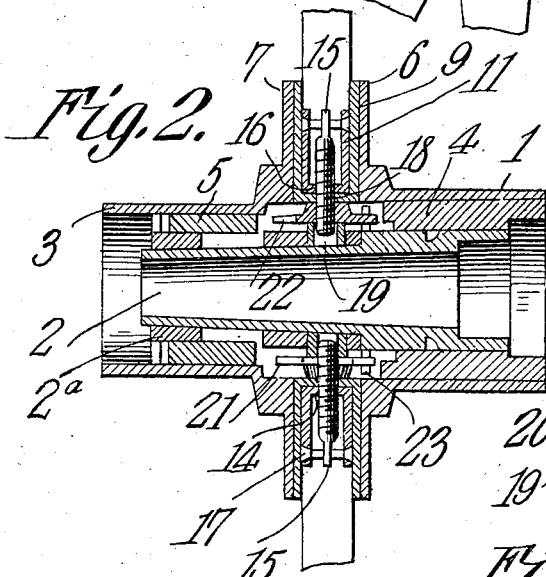
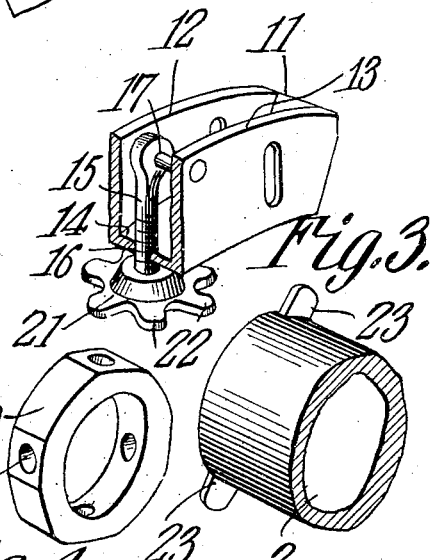
WITNESSES:
Oliver M. Fraley,
INVENTOR.
By C. A. Snow & Co.
ATTORNEYS

UNITED STATES PATENT OFFICE.

OLIVER M. FRALEY, OF VICTOR, OREGON.

VEHICLE-WHEEL.

No. 883,947.　　　Specification of Letters Patent.　　　Patented April 7, 1908.

Application filed July 15, 1907. Serial No. 383,760.

*To all whom it may concern:*

Be it known that I, OLIVER M. FRALEY, a citizen of the United States, residing at Victor, in the county of Wasco and State of Oregon, have invented a new and useful Vehicle-Wheel, of which the following is a specification.

The present invention relates to improvements in vehicle wheels, and it has for its object to provide an improved wheel, wherein the spokes are capable of a radial movement to tighten and loosen the tire so that the latter may be easily applied and removed without the necessity of heating it or otherwise marring the wheel.

Another object of the invention is to provide improved devices that may be operated easily for simultaneously tightening or loosening the spokes, and to so construct the wheel that ample rigidity and strength to withstand the conditions of service are obtained.

To these and other ends, the invention comprises the various novel features of construction and combination and arrangement of parts, which will be hereinafter more fully described, and pointed out particularly in the appended claims.

In the accompanying drawing:—Figure 1 is a view, partly in section, showing the wheel hub constructed in accordance with the present invention. Fig. 2 represents a section on the line 2—2 of Fig. 1. Fig. 3 is a perspective view showing the coöperative relation between the axle box and one of the spoke actuating devices, the reduced portion of the axle box being removed. Fig. 4 is a perspective view of the thrust ring for the spoke actuating devices.

Corresponding parts in the several figures are indicated throughout by similar characters of reference.

The wheel constituting the present invention consists of a hub having outer sleeves 1 and 3 which surround an axle box 2 designed to fit the usual spindle. This axle box is spaced from the sleeves 1 and 3 by tapered sleeves or rings 4 and 5 which are also designed to properly center the axle box within the hub sleeves 1 and 3. Any suitable means such as wedges 2ª may be provided for binding the axle box within the sleeve 5 so as to prevent independent rotation of the sleeve and the axle box. These wedges, however, are removed whenever desired so as to permit independent rotation of the parts.

The hub flanges 6 and 7 are formed on the respective sleeves and are provided with sets of bolt holes to receive bolts 8 which serve to hold the sleeves in coöperative relation and to firmly clamp the spokes in the manner that will be hereinafter more fully described.

Between the flanges of the sleeves is interposed a channel-shaped spoke receiving ring 9 having radial partitions 10 formed therein at suitable intervals to form a series of segmental compartments, and into the latter are fitted the inner ends of the spokes, the latter being preferably grouped to divide the wheel into sections, sets of four spokes being shown in the present instance as grouped together and adapted to engage in the respective compartments.

The outer end portions of the partitions 10 are preferably enlarged or V-shaped in cross section as indicated at 10ª.

In order to minimize wear by reason of friction between the spoke receiving ring and the spokes the latter are preferably provided with a segmental socket 11, the latter being shaped to snugly fit into the correspondingly shaped compartment in the spoke receiving ring, the socket being composed either of sheet metal pressed into form, or it may be made from a casting having parallel side plates 12 and 13 arranged to engage the opposite sides of the spokes, and its ends extend substantially radially of the wheel hub, the inner ends of the spokes abutting against the bottom 14 so that an outward movement of the socket will cause a corresponding movement of the spokes. Each socket is provided with an adjusting screw 15 which may be secured thereto in any suitable way, the screw in the present instance passing through an aperture 16 in the bottom of the socket and being securely anchored by means of a pin or rivet 17 which passes through the side walls of the socket. The inner end of each screw also extends inwardly through an aperture 18 formed in the spoke receiving ring and is arranged in alinement with a radial aperture 19 in a thrust ring 20 which is loosely mounted on the boxing, so that the latter and the hub sleeves and flanges may rotate relatively to the spokes when the locking bolts have been removed. In the present instance, a set of four screws is provided, corresponding in number to the sections or groups into which the spokes of the wheel are divided, and each screw has a nut threaded thereon which is provided with a flange 21 having a series of teeth or projections 22, and the latter coöperate with one or more projections on the boxing or a part rotatable therewith, a pair of projections 23 being shown in the present instance which coöperate simultaneously with diametrically opposite nuts as the boxing is rotated relatively to the spokes, rotation of the boxing in one direction serving to turn the nuts of the set successively to move the spokes outwardly and thereby tighten the tire, while a reverse movement of the sleeve or boxing will serve to loosen the tire by permitting the spokes to move inwardly, so that it is possible to apply and remove the tire of the wheel without resorting to the usual mode of heating the tire to expand it until it is larger than the felly, and it also permits all the parts of the wheel to be kept tight, wear or shrinkage being compensated for.

As the axle box 2 is provided with wedges or other devices for securing it firmly within the hub sleeves 1 and 3, it is possible to adjust the wheel by rotating these sleeves in the appropriate direction, the bolts 8, which extend through the flanges of the hub sleeve and through the walls of the channel-shaped spoke receiving ring, serving to lock the sleeves in adjusted position as well as to firmly clamp the inner ends of the spokes and thus insure ample rigidity. The felly of the wheel is formed in the usual way, that is to say, it is made in sections which connect the outer ends of two or more spokes, the felly being so constructed in the present instance in order that it may not interfere with the radial adjustment of the different sets of spokes.

What is claimed is:—

1. In a vehicle wheel, the combination with the wheel spokes grouped in sets, of an individual actuating device for each group, and means extending between the ends of the spokes for successively adjusting the spoke actuating devices.

2. In a vehicle wheel, the combination with the wheel spokes, of a set of devices for adjusting the spokes radially of the wheel, and revoluble means extending between the ends of the spokes and coöperating with the said devices successively to operate them.

3. In a vehicle wheel, the combination with the wheel spokes, of a set of screws for adjusting them radially, nuts coöperating with the screws, and operating means arranged to coöperate with the said nuts to turn them and adjust the screws.

4. In a vehicle wheel, the combination with the wheel spokes, of a set of screws for adjusting them radially, nuts coöperating with the said screws and having actuating teeth thereon, and a part rotatable relatively to the spokes and having a projection thereon arranged to coöperate with the teeth of the nuts to turn them and adjust the screws.

5. In a vehicle wheel, the combination with the spokes movable radially of the wheel, of a set of screws for adjusting the spokes, and means for operating on the screws successively for adjusting them.

6. In a vehicle wheel, the combination with the spokes movable radially of the wheel, of a set of screws for adjusting the spokes, a part rotatable relatively to the spokes, and means thereon arranged to successively coöperate with the screws for adjusting them.

7. In a vehicle wheel, the combination with the spokes movable radially of the wheel, of a set of screws for adjusting the spokes, nuts coöperating with the screws for adjusting the latter, a part rotatable about the axis of the wheel, and means on the said part arranged to coöperate with the nuts for adjusting the said screws.

8. In a vehicle wheel, the combination with the spokes movable radially of the wheel, of a set of screws for adjusting the spokes, nuts coöperating with the screws and having operating teeth thereon, and a part rotatable about the axis of the wheel and having a projection thereon arranged to coöperate successively with the teeth of the nuts for adjusting their respective screws.

9. In a vehicle wheel, the combination with the spokes movable radially of the wheel, of a set of screws for adjusting the spokes, nuts coöperating with the screws and having operating teeth thereon, and a boxing rotatable relatively to the spokes and having projections thereon arranged to coöperate with the teeth of the nuts for adjusting the screws.

10. In a vehicle wheel, the combination with the spokes movable radially thereof, of a set of devices for adjusting the spokes, revoluble means extending between the ends of the spokes for operating the said devices, and locking devices for the operating means.

11. In a vehicle wheel, the combination with the spokes movable radially of the wheel, of a set of screws for adjusting the spokes, a rotatable boxing, a thrust ring loosely surrounding the boxing, nuts on the screws abutting against the ring, and means operated by the rotary movement of the boxing for turning the nuts to adjust the screws.

12. In a vehicle wheel, the combination with the spokes movable radially of the wheel, and a spoke receiving ring, of adjusting devices for the spokes, hub sleeves having flanges adapted to engage at opposite sides of the said ring, means revoluble within the sleeves for actuating the adjusting devices, and devices connecting the ring and the flanges for locking the hub sleeves in adjusted position.

13. In a vehicle wheel, the combination with a spoke receiving ring having a pair of parallel sides, and the spokes having their inner ends fitted into the said ring and movable radially of the wheel, of devices for adjusting the spokes, hub sleeves provided with parallel out-turned flanges engaging at opposite sides of the ring, revoluble means for actuating the adjusting devices, and devices passing through the said flanges and ring for clamping the spokes in the latter and preventing rotation of the sleeves.

14. In a vehicle wheel, the combination with a channel-shaped spoke receiving ring having a pair of parallel sides, and transverse partitions extending radially thereof, of a set of spokes arranged in groups, a socket to receive the inner end of each group of spokes and adapted to fit into the channel-shaped ring between the partitions thereof, means coöperating with each socket for adjusting it radially, and means for clamping the socket between the sides of the ring.

In testimony that I claim the foregoing as my own, I have hereto affixed my signature in the presence of two witnesses.

OLIVER M. FRALEY.

Witnesses:
E. A. HARTMAN,
E. J. ASCHOFF.